A. S. Woodward. Sewing Machine.

4500 *Reissue.* REISSUED AUG 1 1871

Witnesses:

Gustave Dietrich

Alex L. Roberts

Inventor:

A. S. Woodward

PER

Attorneys.

UNITED STATES PATENT OFFICE.

ALFRED S. WOODWARD, OF BROOKLYN, NEW YORK.

IMPROVEMENT IN PRESSERS AND STITCH-DIVIDERS FOR SEWING-MACHINES.

Specification forming part of Letters Patent No. 110,945, dated January 10, 1871; reissue No. 4,500, dated August 1, 1871.

*To all whom it may concern:*

Be it known that I, ALFRED S. WOODWARD, of Brooklyn, in the county of Kings and State of New York, have invented a new and useful Improvement in Sewing-Machines; and I do hereby declare that the following is a full, clear, and exact description thereof, which will enable others skilled in the art to make and use the same, reference being had to the accompanying drawing forming part of this specification.

My invention has for its object to combine a stitch-dividing instrument with a sewing-machine in such manner that the operation known to the trade as dividing the stitches, hitherto exclusively done by hand, may be automatically done by the machine simultaneously with the stitching. The said stitch-dividing consists in raising the thread between the holes made by the needles, and imparting a rounded and even appearance to it by forcing a blunt awl into the holes behind the stitches after the stitching has been done. The invention consists in the employment of a blunt stitch-divider, in combination with the sewing mechanism, and so operated as to be thrust down between the stitches after they pass from the needle, and raise them between the needle holes, and impart the rounded and even finish required; the operation being performed while the sole is at rest and the needle is punching and withdrawing from the leather, or when the presser falls.

Figure 2:
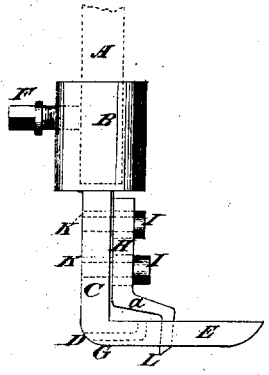
Figure 1:
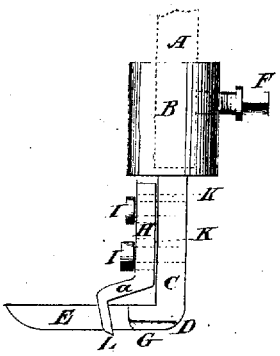
Figure 3:
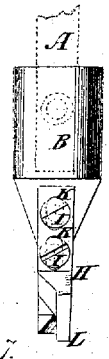
Figure 4:
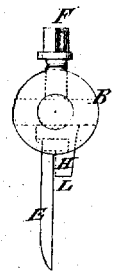
Figure 6:
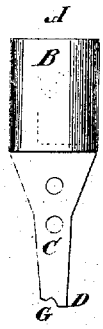
Figure 7:
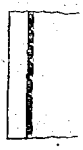
Figure 5:
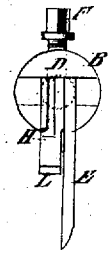
Figure 8:
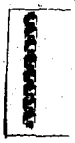

Figure 1 is a side elevation of a presser with a stitch-divider attached to it. Fig. 2 is an elevation of the side opposite to that shown in Fig. 1. Fig. 3 is a front elevation. Fig. 4 is a top view. Fig. 5 is an under-side view. Fig. 6 is a rear view. Fig. 7 represents the stitches as they appear when they come from the needle, and Fig. 8 represents the stitches after being divided.

A indicates the presser-shaft of the sewing-machine, to be operated in the usual way, said shaft being shown in dotted lines. B is the hub by which the presser is connected to the shaft A. *c* is the vertical part of the presser; D, the heel; E, the foot; and F, a set-screw by which the hub is made fast to the shaft. H is the shank of a stitch-divider; and L, the point of a small bent rod or bar of steel, having the shank adapted to be attached to the vertical part *c* of the presser on the side fronting the needle, while the point which is projected toward the needle by the horizontal part *a* extends down below the bottom of the presser-foot, which is so narrowed immediately behind the dividing-awl as to admit the point to be arranged in the line of the seam. The shank is secured to the part *c* by the screws I, and is made adjustable vertically by the holes for the screws being elongated vertically, so that the point may project more or less for entering between the stitches, much or little, as may be required by the nature of the work in hand. The part of the presser behind the stitch-divider has a groove, G, in it to allow the raised stitches to escape without being flattened down again, the foot acting on the leather each side of the stitches. The stitch-divider rises with the presser when attached to it to clear the leather for allowing it to feed along, and drops into the notch between the threads of two stitches when the presser falls, and swells out the thread between the holes, imparting the rounded and even finish thereto indicated in Fig. 8.

It should be stated that in some of the machines in which this stitch-divider will be used the projection of it below the presser will not interfere with the feed, which is effected by a needle which enters the leather from below in a hole formed by an awl working from above and carries the leather along after the awl and the presser have lifted. But I do not limit myself to the employment of the stitch-divider with machines having this kind of feed.

Having thus described my invention, I claim as new and desire to secure by Letters Patent—

1. The combination, with a sewing-machine, of a stitch-divider, adapted to be automatically forced into the notches between the stitches, as the work passes from the needle, for dividing said stitches, substantially in the manner specified.

2. The stitch-divider combined with the presser, and the latter provided with the groove G in the heel, substantially as specified.

ALFRED S. WOODWARD.

Witnesses:
T. B. MOSHER,
GEO. W. MABEE.